INVENTOR
MARTIN B. CONRAD
BY
ATTORNEYS

INVENTOR
MARTIN B. CONRAD
BY
Gausewitz & Carr
ATTORNEYS

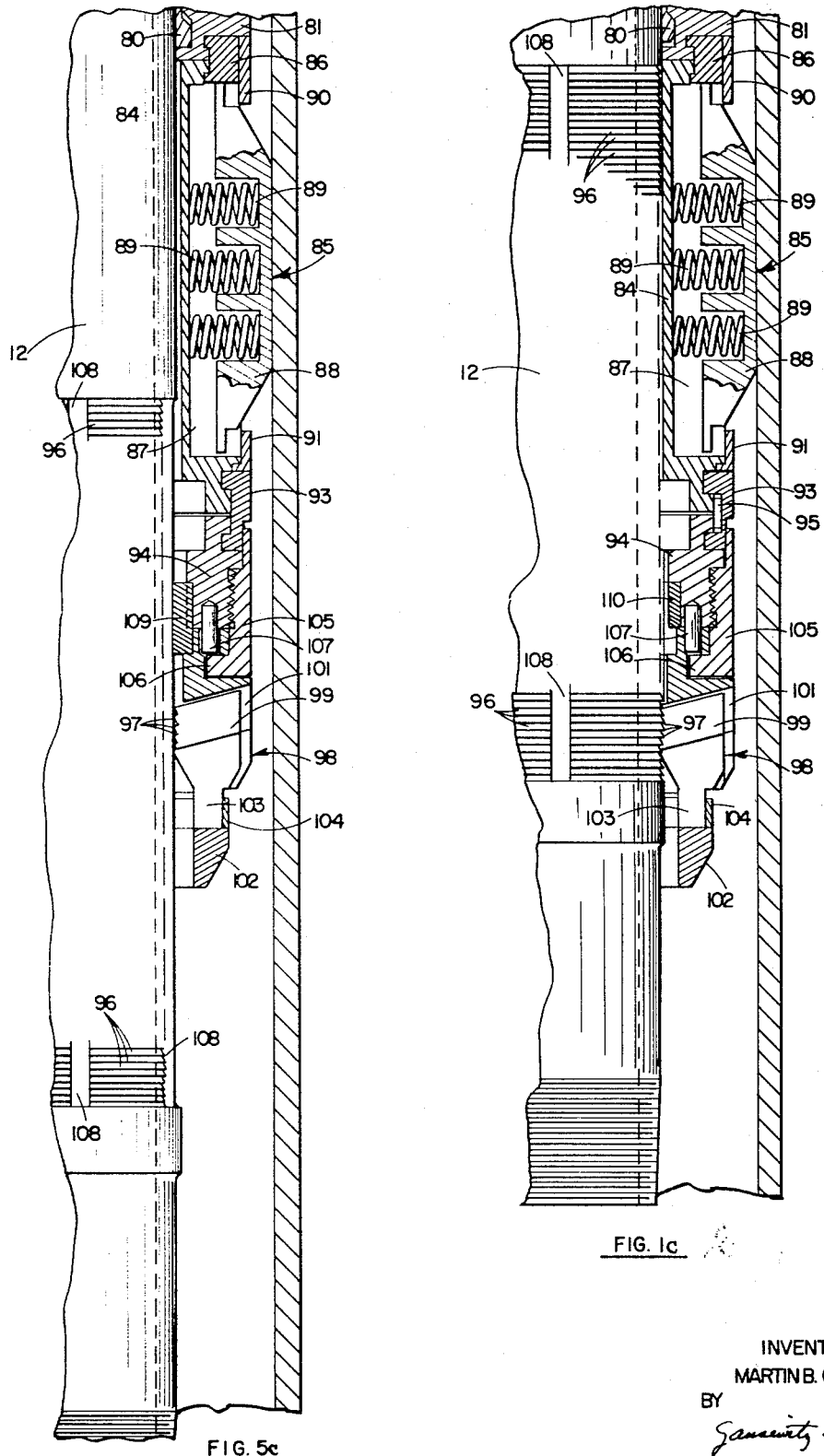

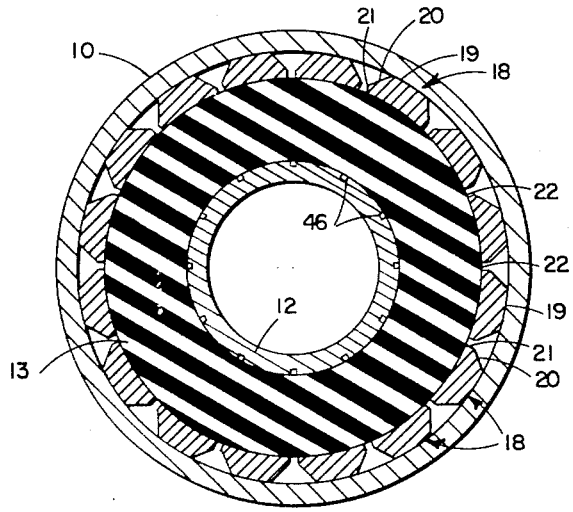
FIG. 3
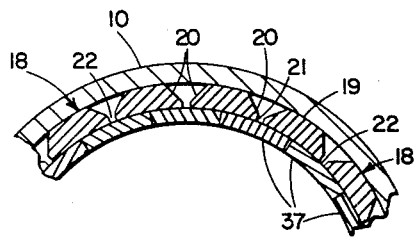
FIG. 4
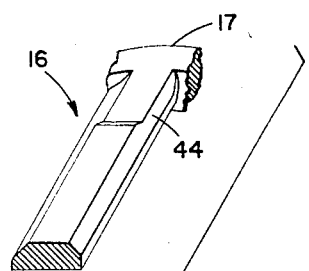
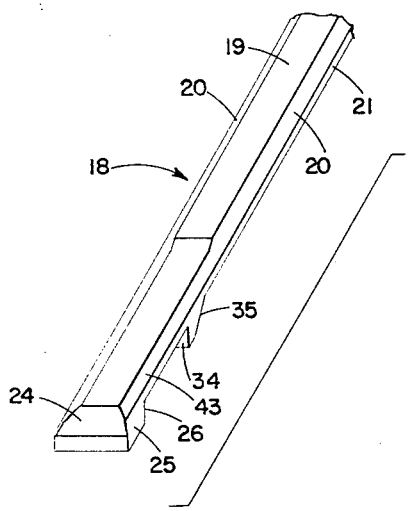
FIG. 2

April 15, 1969  M. B. CONRAD  3,438,438
ANCHOR-PACKER

Filed May 22, 1967  Sheet 5 of 7

INVENTOR
MARTIN B. CONRAD
BY
ATTORNEYS

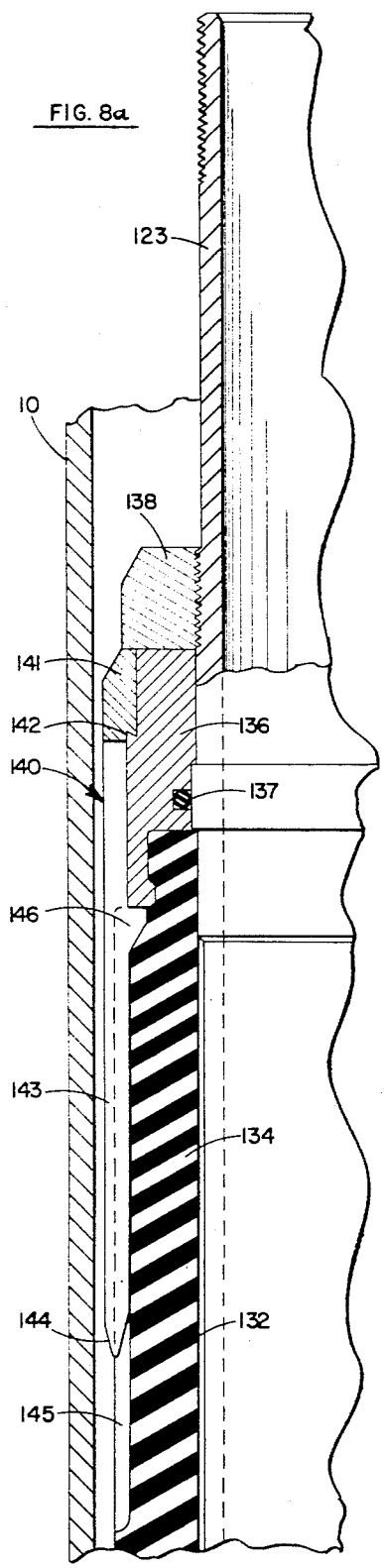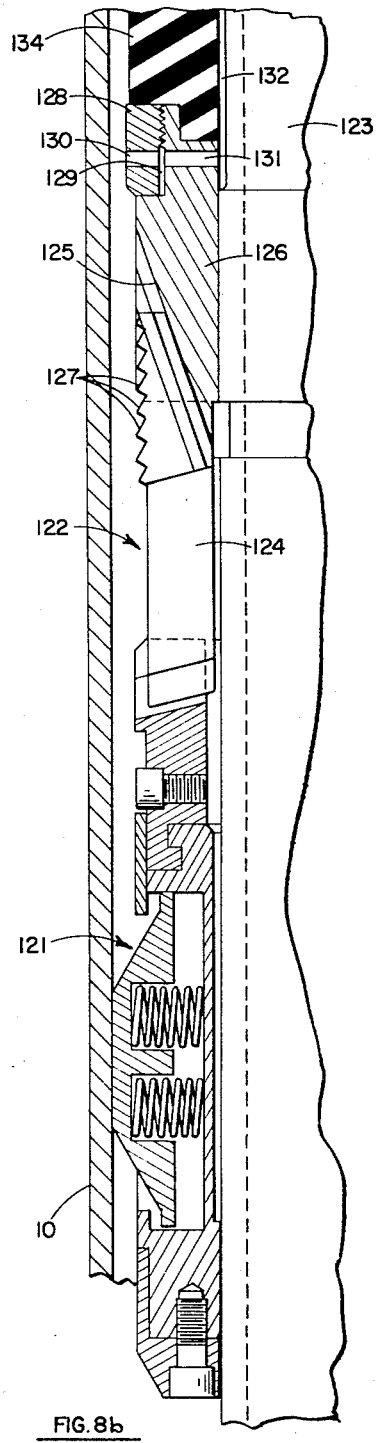

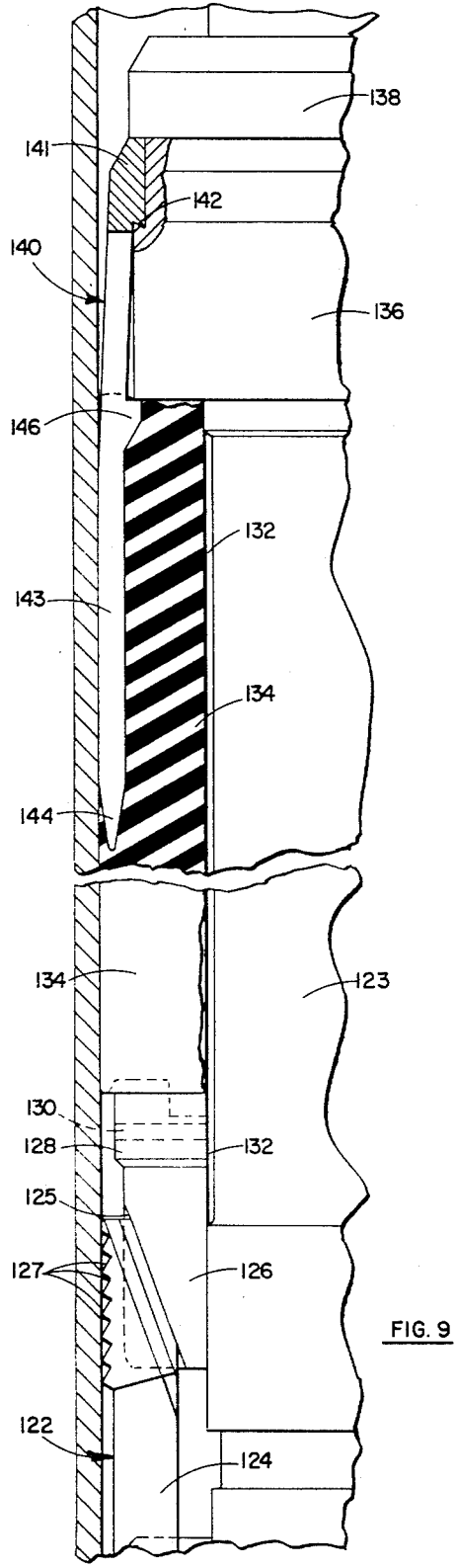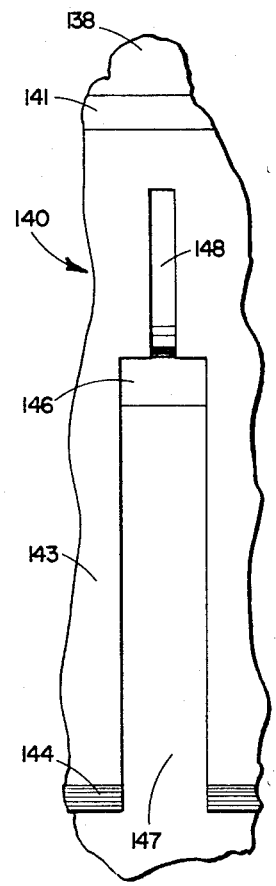
FIG. 9
FIG. 10
INVENTOR
MARTIN B. CONRAD
BY
ATTORNEYS

United States Patent Office 3,438,438
Patented Apr. 15, 1969

3,438,438
ANCHOR-PACKER
Martin B. Conrad, P.O. Box 568,
Carpinteria, Calif. 93013
Filed May 22, 1967, Ser. No. 640,047
Int. Cl. E21b 23/04, 23/06
U.S. Cl. 166—121        15 Claims

ABSTRACT OF THE DISCLOSURE

An anchor-packer device including a compressible packer for sealing engagement with a well casing and an anchor incorporating an expansible sleeve adapted to expand outwardly a segmented element circumscribing it, causing the segments to frictionally engage the wall of a well casing. The packer may be incorporated in the elastomeric sleeve used to expand outwardly the anchor segments.

BACKGROUND OF THE INVENTION

*Field of the invention.*—This invention relates to oil well tools, such as anchors and packers.

*Description of the prior art.*—In the past, anchoring devices have been relatively expensive tools, complex to manufacture and costly to maintain. Typically, an anchor will include buttons which require seals and are a potential source of trouble. Also, they usually employ teeth which are intended to bite into the wall of the casing to lock against longitudinal movement. The teeth may become dulled so that the retention force is reduced materially. Moreover, when they bite into the casing wall, the teeth cause indentations which are a source of subsequent corrosion of the casing. Anchors constructed on the friction-grip principle have been quite expensive, requiring close tolerances and expensive machining operations in their manufacture.

SUMMARY OF THE INVENTION

The present invention provides a combined anchor-packer which can be made at a low cost and avoids the problems of the prior art. The anchor includes a plurality of elongated members which extend around an elastomeric sleeve that is adapted to be expanded outwardly to force the elongated members into frictional engagement with the wall of the casing. The elongated elements are secured together at one end by an annular ring. They include also inward projections which engage shoulders that are fixed relative to a mandrel. This positions the elongated members relative to the mandrel so that the mandrel is prevented from axial movement when the anchor members have engaged the wall of a well casing.

A packer also is incorporated in the device, which is packed off initially by being compressed axially of the mandrel. The packer, particularly for use in shallow holes, may include an elastomeric sleeve which is subject to pressure on its interior, whereupon it acts as a cup and is forced tightly against the wall of the casing. The pressure, therefore, helps pack off the tool, and the packer contributes a frictional force to the retention of the mandrel in the casing. The packer also may be incorporated directly in the anchor device, in which event the elongated elements of the anchor do not extend the full length of the elastomeric sleeve that is inside them. Instead, the sleeve has direct access to the wall of the casing, with a portion of the sleeve acting as the packer and another portion as the means for expanding the anchor elements outwardly.

The anchor members may be relatively closely spaced to provide support for the sleeve to preclude its extrusion between these members when the sleeve is pressurized. Alternatively, the anchor members may have relatively wide gaps therebetween, allowing the sleeve to be distorted outwardly to engage the well casing directly to derive its support from that source. When a sleeve is used as the packer, the space interiorly of the sleeve is vented to the exterior of the mandrel, which assures that the interior of the sleeve is at a low pressure as the tool is being run in, to preclude premature outward bulging of the packer and prevent it from engaging the well casing before the desired time.

An object of this invention is to provide an improved anchor capable of resisting high loads.

Another object of this invention is to provide a simplified, low cost tool serving both as an anchor and a packer.

An additional object of this invention is to provide an anchor avoiding the use of toothed elements and seals and yet which is made at a relatively low cost and is reliable in its operation.

A further object of this invention is to provide an anchor-packer in which the packer means provides a frictional force assisting in holding the tool in a well.

These and other objects will become apparent from the following detailed description taken in connection with the accompanying drawing.

BRIEF DESCRIPTION OF THE DRAWING

FIGURES 1a, 1b and 1c are longitudinal sectional views illustrating the tool of this invention during the time it is being run into the well;

FIGURE 2 is an enlarged fragmentary perspective view of a portion of the anchor device;

FIGURE 3 is a transverse sectional view taken along line 3—3 of FIGURE 5a;

FIGURE 4 is a transverse sectional view taken along line 4—4 of FIGURE 5a;

FIGURES 5a, 5b and 5c are views similar to FIGURES 1a, 1b and 1c, but with the tool set in its operative position;

FIGURES 8a and 8b are longitudinal sectional views of a modified form of the invention in which the anchor and packer are in a single assembly, with the tool being run into the well;

FIGURE 9 is a view similar to FIGURES 8a and 8b, with the tool in the set position; and FIGURE 10 is a fragmentary plan view of the anchor constructed to provide a wide gap between adjacent segments to permit the expansion sleeve to engage the casing.

DESCRIPTION OF THE PREFERRED EMBODIMENTS

Figure 5A:
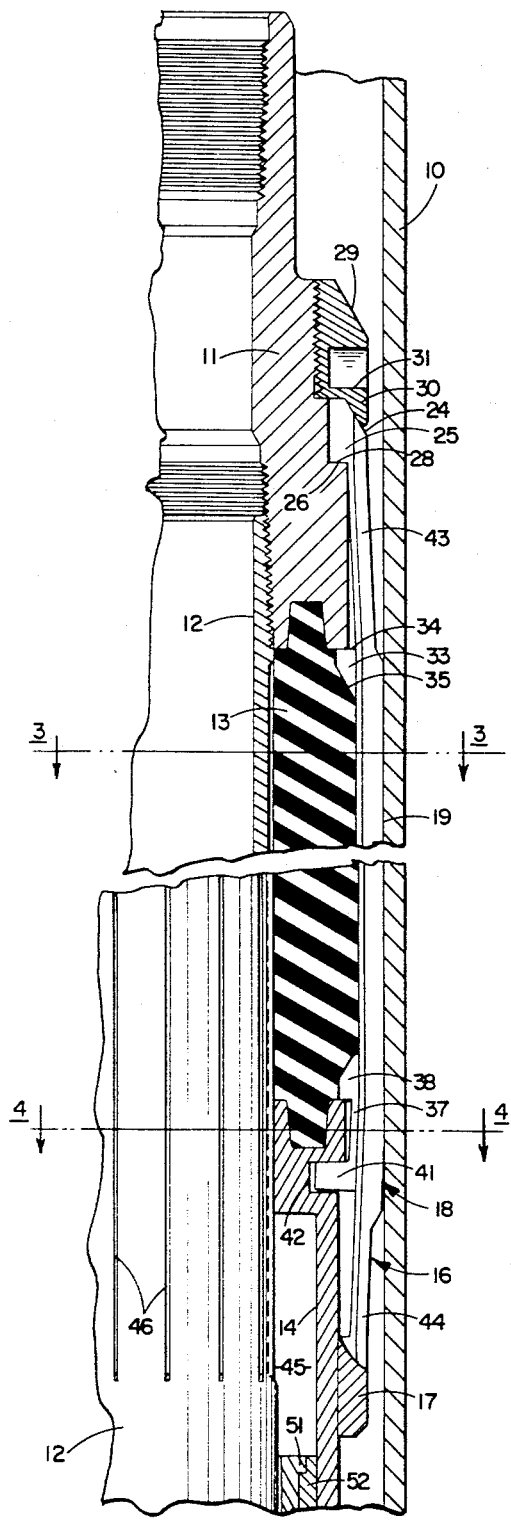
Figure 1A:
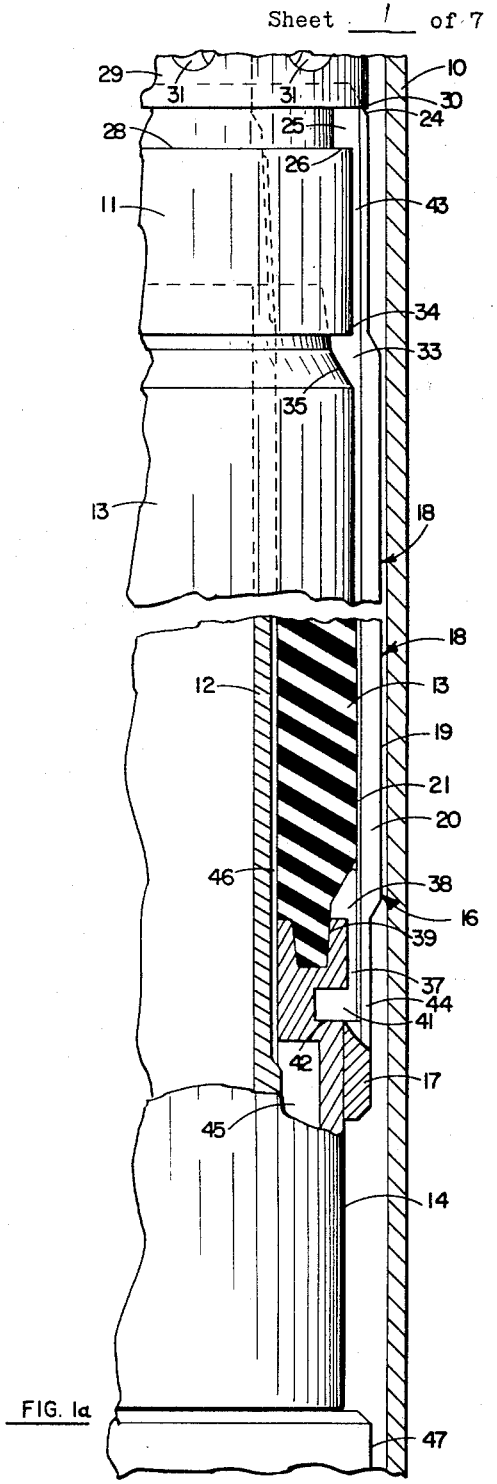
Figure 1B:
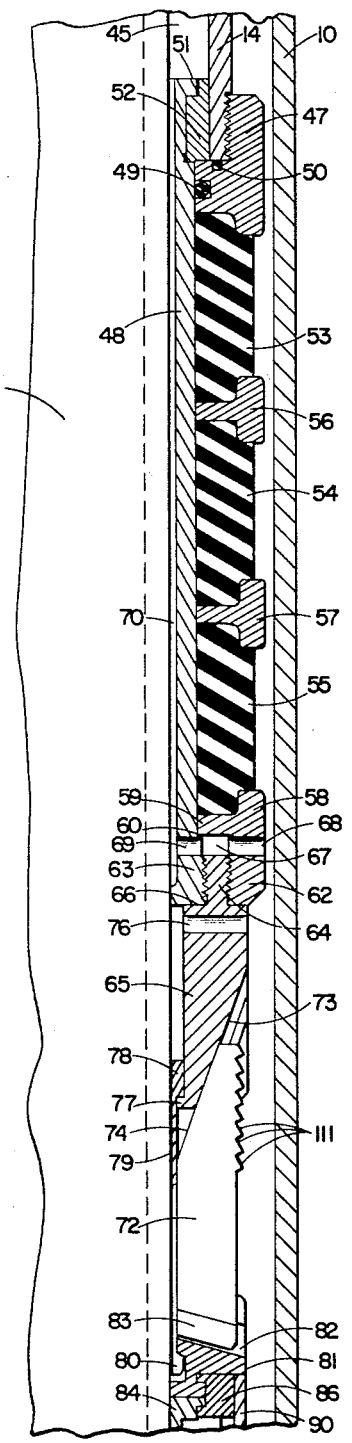

As shown in FIGURES 1a, 1b and 1c, the tool of this invention is being run into a well casing 10. The upper portion of the tool, which appears in FIGURE 1a, includes a sleeve 11 internally threaded at its upper end for connection to a suitable means, such as a tubing string, for introducing the tool into the well. The bottom end of the sleeve 11 also is internally threaded and connects to an elongated mandrel 12 that extends for the length of the tool. The lower edge of the sleeve 11 includes an inwardly tapered recess to receive the upper end of an elastomeric sleeve 13 that circumscribes the mandrel 12. A metallic sleeve 14 extends around the mandrel 12 below the elastomeric sleeve 13, and its upper edge is recessed similarly to receive the lower edge of the elastomeric sleeve.

The sleeves 11, 13 and 14 are circumscribed by an anchor member 16. This member, a segment of which may be seen in perspective in FIGURE 2, includes a continuous ring portion 17 around the sleeve 14, from which projects a plurality of elongated fingers 18 that are integral with the portion 17 and extend upwardly over the sleeves 12 and 13. Each finger 18 includes an outer surface 19, which is adapted to be expanded outwardly and frictionally engage the casing 10 when the anchor is set. Beveled side edges 20 extend from the outer surface to short radially directed side edge portions 21. The fingers are closely spaced apart, with narrow gaps 22 existing between adjacent fingers at their side edge portions 21 so that the fingers will confine the sleeve 13.

The upper ends of the fingers 18 have inclined outer surfaces 24 and inward projections 25 having radial shoulders 26 at their lower ends. The upper sleeve 11 includes a radial outwardly facing shoulder 28 next to which fit the shoulders 26 of the fingers 18. Threaded onto the upper end of the sleeve 11 is a collar 29 having a beveled flange 30 which fits over the beveled surfaces 24 of the upper ends of the fingers 18. Thus, the upper ends of the fingers are retained between the abutment surfaces 30 and 28 of the members 29 and 11. Apertures 31 in the periphery of the collar 29 allow it to be rotated by an appropriate tool as it is threaded onto the member 11 to retain the fingers 18.

An additional inward projection 33 is included at a location spaced below the inward projection 25 of each finger. The projection 33 includes a radial upper edge 34 whch fits immediately below the lower edge of the upper sleeve 11. The lower end portion of the inward projection 33 has a beveled surface 35 which lies against a similarly contoured portion of the outer part of the elastomeric sleeve 13. The edge 34 of the inward projection 33 of the fingers forms an abutment that helps position the fingers against movement in an upward direction. Moreover, the inward projections 33 assist in retaining the upper end of the elastomeric sleeve 13 axially and preventing its extrusion beyond the edge of the sleeve 11 when the tool subsequently is pressurized and the anchor is set.

Inwardly of the fingers 18 and above the ring portion 17 are segments 37, which are generally U-shaped in side elevation. The upper end portions 38 of the segments 37 are contoured generally as the inward projections 33 of the fingers, and overlie the upwardly tapered edge portion of the elastomeric sleeve 13. Shoulders 39 of the upper end portions 38 of the segments 37 fit above the upper edge portion of the sleeve 14. The lower ends of the segments 37 include inwardly extending flanges 41 which fit within a recess 42 in the outer circumference of the sleeve 14.

The sections 43 and 44 of the fingers immediately beneath the upper finger ends and above the lower ring section 17, respectively, are of reduced thickness. This permits flexure of the fingers 18 at those locations upon subsequent pressurization of the elastomeric sleeve 13.

Below its upper end, the sleeve 14 is enlarged internally, providing a clearance space 45 around the mandrel 12. Longitudinal grooves 46 are formed in the mandrel, providing communication between the space 45 and the inner surface of the elastomeric sleeve 13. A gauge ring 47 is threaded onto the lower end of the sleeve 14 (see FIGURE 1b), extending around a cylindrical sleeve 48 with respect to which it is sealed by an O-ring 49. An additional seal 50 is provided between the gauge ring 47 and the bottom edge of the sleeve 14. The upper end of the sleeve 48 includes an outwardly projecting flange 51, thereby providing a recess inwardly of the lower end portion of the sleeve 14. A split ring 52 fits in this recess and against the upper adjacent edge portion of the gauge ring 47. The split ring 52 ties the tool together so that the gauge ring 47 cannot move upwardly relative to the mandrel 12. This does not prevent downward movement of the gauge ring 47, however.

Below the gauge ring 47 are three resilient elastomeric packing rings 53, 54 and 55. Additional rings 56 and 57 are positioned between packers, the member 56 being located between the packing rings 53 and 54, and the ring 57 being positioned between the packing rings 54 and 55. A gauge ring 58 is located beneath the lower packer 55. The gauge ring 58 includes a radial flange portion 59 which extends along the lower edge of the packing ring 55 and to the outer surface of the sleeve 48. A small outer shoulder 60 is provided on the outer surface of the sleeve 48 and is engaged by the inner portion of flange section 59 of the gauge ring 58.

The lower portion 62 of the gauge ring 58 has an internal thread on it. A corresponding thread is provided on the lower end section 63 of the sleeve 48. The threads are spaced apart to result in an annular threaded opening that receives an upper threaded flange portion 64 of a member 65 which has a shoulder 66 immediately below the threaded flange portion. Therefore, the section 64 threads into the annular threaded opening a predetermined distance, at which time the shoulder 66 engages the bottom edge of the lower sleeve portion 63 and the bottom edge of the lower gauge ring portion 62. The result is an annular space 67 above the threaded ring 64 and between the gauge ring 58 and the sleeve 48.

The gauge ring 58 is provided with a radial opening 68, providing communication between the exterior of the tool and the space 67. An additional radial opening 69 extends through the lower portion of the sleeve 48, connecting to the clearance space 70 between the sleeve 48 and the periphery of the mandrel 12. Thus, through the opening 68, the annular space 67 and the opening 69, there is communication from the exterior of the tool to the space 70 inwardly of the sleeve 48. This, in turn, leads to the clearance 45 inwardly of the sleeve 14. By connecting the openings 68 and 69 through the annular space 67, it is not necessary that these openings be radially aligned as they are illustrated in FIGURE 1b. Consequently, it is easier to manufacture and assemble the tool because of the lack of necessity for indexing to align these apertures.

The member 65 serves as the means for expanding slips 72 outwardly when the tool is to be set subsequently. To this end, the member 65 includes a conical lower surface 73 engaged by the tapered surfaces 74 of the slips 72. A radial bleed opening 76 extends through the wall of the member 65. At the lower edge of the member 65 is an inwardly directed flange 77, adjacent which is an outer flange 78 on the longitudinally slotted sleeve 79. At the bottom end of the sleeve 79 is another outwardly projecting flange 80, extending within a recess in a retainer member 81 having T-slots 82 that receive the base portions 83 of the slips 72. Therefore, the sleeve 79 prevents the base 81 of the slip assembly from moving downwardly relative to the member 65, which in turn keeps the slips adjacent the conical surface 73.

The lower edge of the retainer member 81 butts against the upper end of a tubular housing 84 which forms a portion of a drag block assembly 85. The members 81 and 84 are coupled by a split ring 86 of generally U-shaped cross section, having inwardly extending flanges to fit over corresponding outward flanges of the members 81 and 84.

The tubular housing 84 of the drag means 85 is provided with slots 87 within which are drag blocks 88 biased outwardly by compression springs 89 (see FIGURE 1c). A flange 90 around the split ring 86 overlaps the slots 87 to prevent the drag blocks 88 from separating from the tool when it is outside the well. A similar flange element 91 is provided at the lower end of the slots 87.

A split ring 93 connects the tubular housing 84 of the drag assembly to a member 94 beneath in a manner generally similar to the connection afforded by the split ring 86 between the member 84 and the member 81. A key 95 is provided to prevent relative rotation between the members 84 and 94.

Below the drag block assembly 85 is a mechanism for releasably connecting the mandrel to the components circumscribing it. This allows the mandrel to be released to permit relative axial movement of the mandrel in setting the tool. An arrangement of this type is shown and described in detail in United States Patent No. 3,135,329, and a construction of somewhat similar nature is illustrated in United States Patent No. 3,094,169.

In the embodiment of FIGURE 1c, the mandrel 12 is provided with wickers 96 on its periphery, engaged by corresponding wickers 97 in the inner surface of a dog unit 98. The upper end portion 99 of the dog element 98 is flanged outwardly to have generally a T shape, and is received in a correspondingly contoured inclined slot 100 in a dog carrier body 101. The lower end of the dog unit 98 includes a continuous ring portion 102 from which extends an arm section 103 connecting to the upper portion of the dog. Extending over the arm portion 103 and around the mandrel is a resilient annular band 104, which urges the dog inwardly against the surface of the mandrel. This maintains the wickers 97 of the dog in engagement with wickers 96 of the mandrel.

A connector sleeve 105 extends above the dog carrier body 101 to thread onto the member 94. A flange portion 106 extends inwardly of the lower end of the connector sleeve 105 and into a recess in the dog carrier body 101. A dowel pin 107 extends from the upper end of the dog carrier body 101 to the member 94, preventing relative rotation of these elements.

Th wickers 96 on the surface of the mandrel are not continuous about their circumference but include an interrupted portion 108. In disconnecting the dog 98 from the wickers 96, therefore, the mandrel is rotated to bring the portion 108 beneath the wickers 97 of the dog. The dog 98 then is free for relative axial movement with respect to the mandrel 12. A stop 109 is carried by the mandrel and brought into engagement with a corresponding stop 110 of the member 94 in rotationally positioning the mandrel when the dog 98 is disconnected. Upon rotation in one direction to bring the stops into interengagement, it is known that the wickers 97 of the dog are aligned properly with the portion 108 of the mandrel where there are no wickers, resulting in the disconnection.

After the tool has been lowered to the desired position in the well, the mandrel 12 is rotated. This causes it to turn relative to the dog 98, which is held against rotation because of its connection through the dowel pin 107 and the key 95 to the drag blocks 88. Consequently, the mandrel 12 is rotated to the position where the wickers are disconnected, freeing the dog 98 from the mandrel.

Figure 5B:
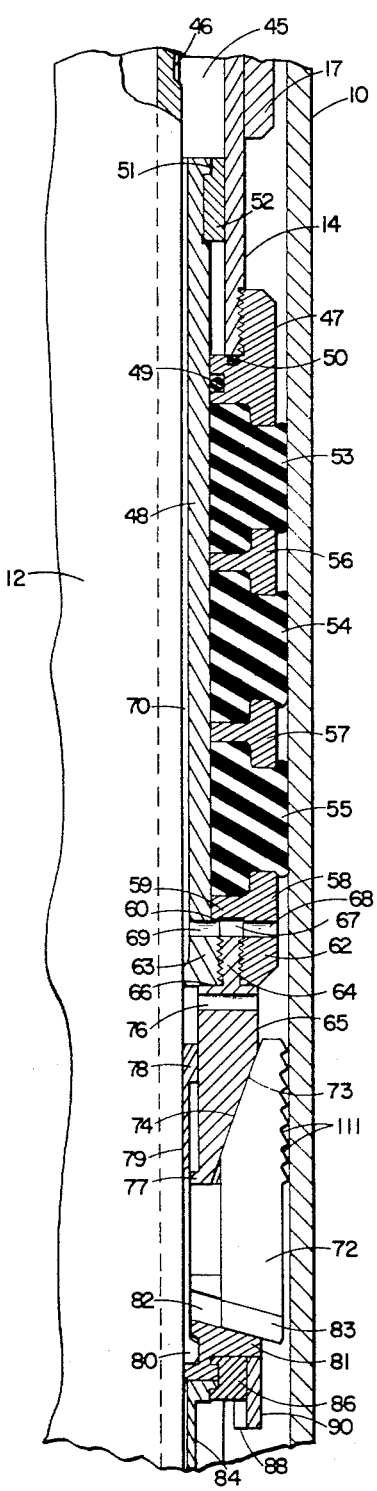

After this, a downward force is applied on the mandrel to pack ot the tool. This force is transmitted through the upper sleeve 11, which is threaded to the mandrel, the elastomeric sleeve 13, the sleeve 14 beneath it, to the packing elements 53, 54 and 55, and from them to the cone 65 of the slip assembly. The drag blocks 88, being held against the casing wall by friction, resist the downward movement of the slips. Consequently, the slips 72 slide outwardly along the inclined surface 73, causing the wickers 111 of the slips to be brought into engagement with the wall of the casing 10. As soon as the slips are set, the downward force on the mandrel compresses the packing rings 53, 54 and 55 between the gauge rings 47 and 58. This squeezes the packing rings outwardly into engagement with the wall of the casing, as shown in FIGURE 5b, thereby packing off the tool.

Next, the anchor is set, which is accomplished by introducing fluid into the space beneath the elastomeric sleeve 13. The pressure is applied from below, with the fluid entering the aperture 68, passing through the annular space 67 into the opening 69. From there, the fluid pressure is transmitted through the clearance space 70 to the space 45 inwardly of the sleeve 14. The grooves 46 in the surface of the mandrel then conduct the pressurized fluid to the space radially inwardly of the elastomeric sleeve 13. Consequently, the pressurized fluid expands the elastomeric sleeve outwardly.

As the outward expansion takes place, the fingers 18 of the anchor element 16 are deflected at their end portions 43 and 44 and likewise moved outwardly. The sleeve 13 becomes expanded sufficiently to bring the outer surfaces 19 of the fingers 18 into engagement with the wall of the casing 10. This contact along the surfaces 19 of the fingers provides a frictional force that retains the tool in place against high axial loading. The members 18 provide a large area of contact around the circumference of the tool, so that considerable friction force is generated. The anchor constructed in this manner is capable of withstanding exceptionally high end loads. During the time the sleeve 13 is pressurized, it is confined by the fingers 18, and will not extrude through the narrow gaps 22 between adjacent fingers.

The device requires no buttons with seals and has no teeth to cut into the wall of the casing or to become dulled and slip. At the same time, the unit is constructed very economically, having relatively simple components made without requirement for close tolerances.

For retrieval of the tool, the pressure beneath the sleeve 13 is relieved, whereupon the fingers 18 of the anchor element straighten out and resume their original contour. When an upward force then is applied to the mandrel, a pull is exerted through the anchor 16 to the sleeve 14, pulling upwardly on the gauge ring 47 and relieving the compression of the packers. The tool then is pulled from the well. Thus, release is accomplished without difficulty.

Figure 7:
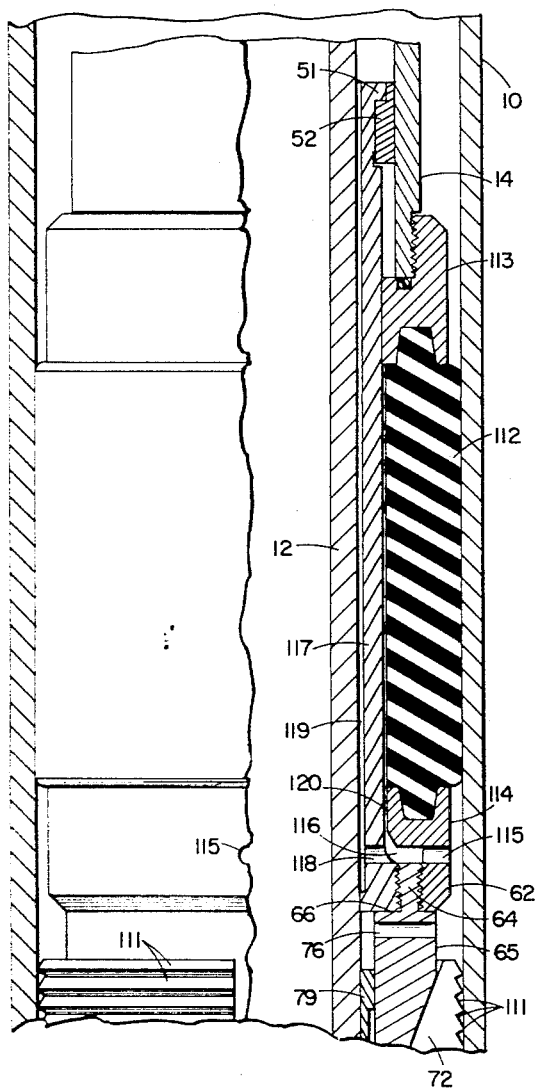
FIGURE 7 is a view similar to FIGURE 6, with the packer set.
Figure 6:
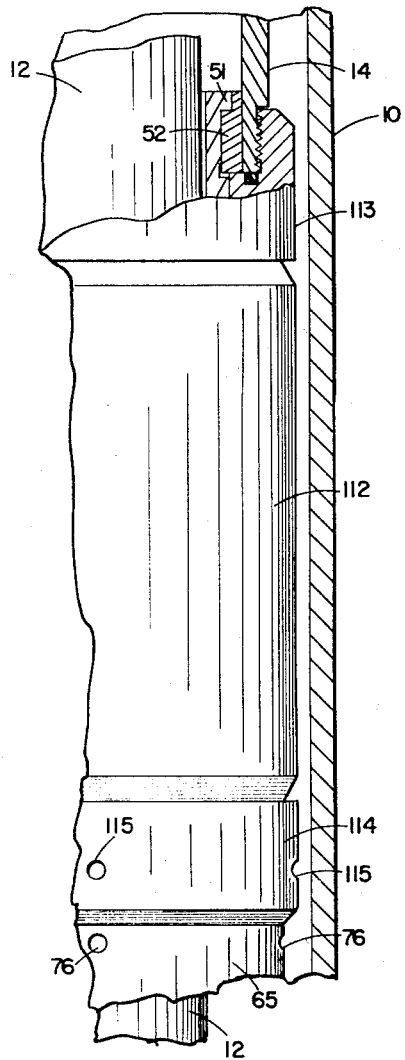
FIGURE 6 is a fragmentary longitudinal sectional view showing a modified form of packer.

Particularly for use in shallow holes, the design of FIGURES 6 and 7 may be utilized, where the construction of the packer portion is modified, but the remainder of the tool may remain as before. Here, a single elastomeric sleeve 112 replaces the three packers 53, 54 and 55. The upper gauge ring 113 is recessed to receive the upper end of the sleeve 112, and a similar construction is provided for the lower gauge ring 114. As before, the lower gauge ring 114 threads onto the upper end portion 64 of the member 65 that forms a part of the slip assembly. An opening 115 through the lower gauge ring 114 provides communication between the exterior of the tool beneath the sleeve 112 and the annular space 116 outwardly of sleeve 117, which corresponds to the sleeve 48 of the previously described embodiment. An opening 118 through the sleeve 117 provides communication to the space 119 between the sleeve 117 and the mandrel 12.

A clearance 120 is provided at the inner surface of the gauge ring 114, leading to the space between the sleeve 112 and the outer surface of the member 117. This means that pressure from beneath the tool will have access to the inside of the sleeve 112 after the tool has been packed off and when the anchor is activated. Consequently, the pressure applied to the tool also forces the periphery of the packer sleeve 112 into tight contact with the wall of the casing 10. The result is that the tool is packed off very tightly, and the packer rubber will provide a frictional force helping hold the tool axially within the well.

Normally, this construction is utilized for relatively shallow holes because the pressures in such wells are less than in deeper wells. If the pressure is particularly great, it is possible for the sleeve 112 to extrude into the gap between the gauge ring 113 and the casing 10. At lower pressures, however, the sleeve 112 acts as a cup, and the pressure applied to its interior simply helps pack off the tool.

The openings 115 and 116 not only provide the means for introducing fluid into the space between the sleeve 112 but also act as a vent during the time that the tool is being run into the well. This means that the inside of the elastomeric sleeve 112 is vented to the pressure exteriorly of the tool, rather, than interiorly of the tool as the device is being run in. While the tool is being run into the well, fluid passing the exterior of it is at relatively high velocity. As a result, it also is at a lower static pressure. By venting the underside of the elastomeric sleeve 112 to the exterior, therefore, the inside of the sleeve also is at this relatively low static pressure. Consequently, there is no tendency for the pressure during the time that the tool is being run in to bulge the sleeve 112 outwardly and force it prematurely against the wall of the casing. This would not be true, on the other hand, if there were communication between the interior of the mandrel and the underside of the sleeve.

The tool can be constructed as illustrated in FIGURES 8a and 8b, in which the packer and anchor portions are combined in one unit. This version of the tool is of even greater simplicity and more economical to construct than the embodiments described above. It is versatile in that it may be run into the well in either direction. The tool includes a drag block assembly 121 and a slip assembly 122, generally similar to the corresponding units in the previously described embodiment. These assemblies circumscribe a mandrel 123 that extends the length of the tool. The slips 124 engage the inclined surface 125 of a cone 126, which provides the means for expanding the slips outwardly to bring their wickers 127 into engagement with the wall of the casing 10.

A gauge ring 128 threads onto the upper end of the member 126, as the device is shown, inwardly of which is an annular gap 129. An aperture 130 extending radially through the ring 128 provides communication with the gap 129. An additional opening 131 extends through the member 126 to a groove 132 on the periphery of the mandrel 123. The passageway 132 extends beneath the inner surface of an elastomeric sleeve 134. The lower end of the sleeve 134 extends beneath the overhanging end of the bottom of the member 126 and is engaged also by the gauge ring 128. The opposite end of the sleeve 134 is received within a collar 136, which is sealed with respect to the mandrel by an O-ring 137. A ring 138 threads onto the mandrel and engages the upper end of the collar 136.

The anchor assembly 140 includes a continuous annular portion 141 that circumscribes the collar 136. It is held in place by the overhanging shoulder 142 of the collar 136 and by the edge of the ring 138. Projecting beyond the annular portion 141 and over the elastomeric sleeve 134 are fingers 143. These are separate elements having no interconnection at their distal ends 144. The surface of the sleeve 134 may include grooves 145 receiving the inner portions of the fingers 143, but which are longer than the fingers. Adjacent the lower end of the member 136, each finger includes an inwardly projecting portion 146 that helps position and retain the fingers.

In setting the tool to the position shown in FIGURE 9, it is packed off by exerting a downward force on the mandrel 123. Because of the resistance from the drag block assembly 121, the slips then are caused to expand outwardly as they ride along the inclined surface 125 of the member 126. This brings the wickers 127 into engagement with the wall of the casing 10, setting the slips. The force then is applied through the ring 138 and the member 136 to the upper end of the elastomeric sleeve 134. Consequently, the sleeve 134 is caused to expand outwardly as it is compressed between the members 126 and 136. As this occurs, the sleeve 134 is foreshortened, but the fingers 143 do not interfere with the natural movement of the sleeve because they merely ride downwardly along the grooves 145. Thus, upon exertion of the downward push, the outward expansion of the sleeve 134 causes it to become set as a packer.

After this, pressure is admitted into the interior of the sleeve 134. This pressure comes from below the tool through the opening 130 into the annular passageway 129 and the opening 131 in the member 126. The pressurized fluid can enter the recess 132 in the surface of the mandrel, thereby having access to the interior of the elastomeric sleeve 134. The sleeve 134, therefore, is expanded outwardly. This, in turn, causes the fingers 143 to be forced outwardly against the wall of the casing to provide a firm gripping engagement with the casing. The fingers provide an anchoring force which will resist high end loads and retain the tool in position. The inner pressure also, by forcing the sleeve 134 outwardly, causes it to exert a frictional force which will augment the anchoring capability.

In this construction, the openings 129, 130 and 131 vent the space beneath the sleeve to the space outside the mandrel during the time the tool is being run into the well. As for the sleeve 112, this venting maintains the interior of the sleeve 134 at a relatively low pressure, and assures that it is not expanded outwardly during this condition.

The fingers 143 may be closely spaced from each other in order to prevent extrusion of the sleeve 134 between them as the pressure is introduced into the inside of the sleeve. Alternatively, they may be relatively widely spaced apart deliberately to allow the material of the sleeve 134 to be pressed outwardly against the wall of the casing and supported by the casing at those locations rather than the interiors of the fingers. This construction may be seen in FIGURE 10, where there is a relatively wide gap 147 between the adjacent projecting portions of the fingers 143. At the inner ends of the fingers where they extend over the member 136, the gap 148 is made relatively narrow. This is because it is desired to prevent extrusion axially over the member 136, but to confine the movement of the sleeve 134 in a radially outward direction. With this arrangement, when the sleeve is pressurized, the portions at the gaps 147 merely are deflected out to the wall of the casing 10 and supported by the casing during the time the pressurization occurs. This type of construction is adaptable also to the design of FIGURES 1a, 1b and 1c, where the anchor is in a separate unit.

The foregoing detailed description is to be clearly understood as given by way of illustration and example only, the spirit and scope of this invention being limited solely by the appended claims.

I claim:
1. A device for being positioned in a well comprising
a body adapted to be inserted into a well,
packer means on said body,
means for compressing said packer means axially for thereby expanding said packer means radially for engagement with the wall of a well,
anchor means on said body,
    said anchor means including a plurality of elongated members extending longitudinally of said body around the exterior thereof,
    means integrally connecting said members at one end thereof,
    and expansible means for forcing said members outwardly into engagement with a well casing in response to fluid pressures thereon,
and means substantially preventing relative longitudinal movement of said anchor means and said body.

2. A device for being positioned within a well comprising
an elongated tubular body adapted for insertion in a well,
anchor-packer means for holding said body in a well and providing a seal relative thereto,
    said anchor-packer means including a plurality of longitudinally extending elongated members around said body,
    means integrally securing said members together at one end portion thereof,
    means retaining said members against longitudinal movement relative to said body,
    sleeve means,
        said sleeve means including an expansible sleeve inwardly of said members for forcing said members outwardly for frictionally engaging the wall of a well into which said body has been inserted,
    and means providing fluid communication to the interior of said sleeve means for admitting pressurized fluid and causing expansion of said sleeve means, and means for compressing axially at least a portion of said sleeve means for expanding the same radially outwardly into engagement with the wall of a well.

3. A device as recited in claim 2 in which said means providing fluid communication to the interior of said sleeve means extends from the exterior of said body to said sleeve means for maintaining the interior of said sleeve means at a relatively low pressure during movement of said device in a well.

4. A device as recited in claim 2 in which said elongated members are positioned in close adjacency so that said elongated members provide support for said sleeve means and prevent deflection thereof between adjacent elongated members.

5. A device as recited in claim 2 in which said elongated members are spaced relatively widely apart for permitting deflection of said sleeve means therebetween upon said expansion of said sleeve means by said pressurized fluid.

6. A device as recited in claim 2 in which said expansible sleeve means includes a portion thereof directly engageable with the wall of a well into which said body has been inserted upon said expansion of said sleeve means.

7. A device for being positioned in a well comprising
a body adapted to be inserted into a well,
packer means on said body,
means for compressing said packer means axially for causing radial expansion thereof into engagement with the wall of a well,
anchor means on said body,
    said anchor means including a plurality of elongated members extending longitudinally of said body around the exterior thereof,
    and expansible sleeve means,
        said elongated members being generally parallel to the axis of said body and having longitudinal exterior surfaces outwardly of said sleeve means for frictionally engaging a well casing upon expansion of said sleeve means,
        said expansible sleeve means including a portion inwardly of said members for forcing said members outwardly and said longitudinal surfaces into said engagement with a well casing in response to fluid pressures thereon,
        said expansible sleeve means having an additional portion remote from said members for engaging a well casing and forming a packer in response to said fluid pressures,
and means substantially preventing relative longitudinal movement of said anchor means and said body.

8. A device for being positoned within a well comprising
a body adapted to be inserted into a well,
a plurality of longitudinally extending fingers,
a rigid annular element at one end of said fingers integrally attaching said fingers together,
    said fingers being unattached to each other outwardly of said annular element,
abutment means on said body,
    said fingers having abutment means for cooperating with said body abutment means for precluding substantial longitudinal movement of said fingers relative to said body,
an elastomeric sleeve circumscribing said body inwardly of said fingers,
and means providing fluid communication to the interior of said elastomeric sleeve for expanding said elastomeric sleeve in response to fluid pressure and forcing said fingers into frictional engagement with the wall of a well casing.

9. A device of being positioned in a well comprising
a tubular mandrel adapted for insertion into a well,
packer means around said mandrel,
means for squeezing said packer means axially of said mandrel for thereby forcing said packer means outwardly for packing off against the wall of a well,
and an anchor means,
    said anchor means including an elastomeric sleeve circumscribing said mandrel,
    means retaining the ends of said sleeve,
    means providing fluid communication to the interior of said sleeve for expanding said sleeve outwardly,
    a plurality of elongated members,
        said elongated members extending around said sleeve and over the ends thereof,
    means at one end of said elongated members securing said elongated members together,
    abutment means on said mandrel,
    and abutment means on said fingers for cooperating with said abutment means on said mandrel for positioning said elongated members axially relative to said mandrel,
        said elongated members being movable outwardly for engagement with the wall of a well casing in response to said outward expansion of said elastomeric sleeve.

10. A device as recited in claim 9 in which said packer means includes an elastomeric sleeve, and including means providing fluid communication with the interior of said elastomeric sleeve of said packer means for causing fluid pressure to assist in packing off said packer means and causing said packer means to exert a frictional force against the wall of a well casing.

11. A device as recited in claim 10 in which said means providing fluid communication with said elastomeric sleeve of said packer means includes passage means communicating with the exterior of said mandrel for assuring that the interior of said packer means sleeve is at a relatively low pressure during movement of said device in a well.

12. An anchor-packer device comprising
an elongated mandrel adapted for insertion in a well casing,
an elastomeric sleeve circumscribing said mandrel,
means retaining the ends of said sleeve,
means for exerting an axial force on said sleeve for compressing said sleeve axially for expanding said sleeve outwardly,
means providing fluid communication to the inside of said sleeve for allowing fluid pressure to force said sleeve outwardly,
and an anchor member,
    said anchor member including a plurality of elongated members extending longitudinally of said sleeve for expansion outwardly by said sleeve into engagement with a well casing for frictional engagement thereof,
    said elongated members extending less than the length of said sleeve,
        whereby a portion of said sleeve is engageable directly with the wall of a well casing for acting as a packer upon said outward expansion of said sleeve.

13. A device as recited in claim 12 in which
said elastomeric sleeve includes grooves receiving said elongated members,
    said grooves being longer than said elongated members,
        whereby upon said axial compression of said elastomeric sleeve said elongated members substantially remain in said grooves.

14. A device as recited in claim 12 in which said elongated members are closely spaced apart for providing peripheral support for said elastomeric sleeve and precluding extrusion of said elastomeric sleeve between adjacent elongated members.

15. A device as recited in claim 12 in which said elongated members adjacent said sleeve are spaced relatively widely apart for permitting said elastomeric sleeve to be deflected between adjacent elongated members for engagement with the wall of a well casing upon said expansion of said elastomeric sleeve.

References Cited

UNITED STATES PATENTS

| | | | |
|---|---|---|---|
| 1,549,168 | 8/1925 | Townsend | 166—187 |
| 2,082,112 | 6/1937 | Layne et al. | 166—206 X |
| 2,196,658 | 4/1940 | Burt | 166—187 X |
| 2,652,894 | 9/1953 | Brown et al. | 166—206 X |
| 2,691,418 | 10/1954 | Connolly | 166—212 X |
| 2,884,070 | 4/1959 | Potts | 166—121 |
| 2,970,651 | 2/1961 | Roberts | 166—120 X |
| 3,306,361 | 2/1967 | Lebourg | 166—122 |
| 3,318,605 | 5/1967 | Brown | 166—187 X |
| 3,343,607 | 9/1967 | Current | 166—135 X |

DAVID H. BROWN, *Primary Examiner.*

U.S. Cl. X.R.

166—134, 212